July 27, 1926.
H. DE W. KING
METHOD OF MAKING SHINGLES
Filed Dec. 10, 1925
1,593,800
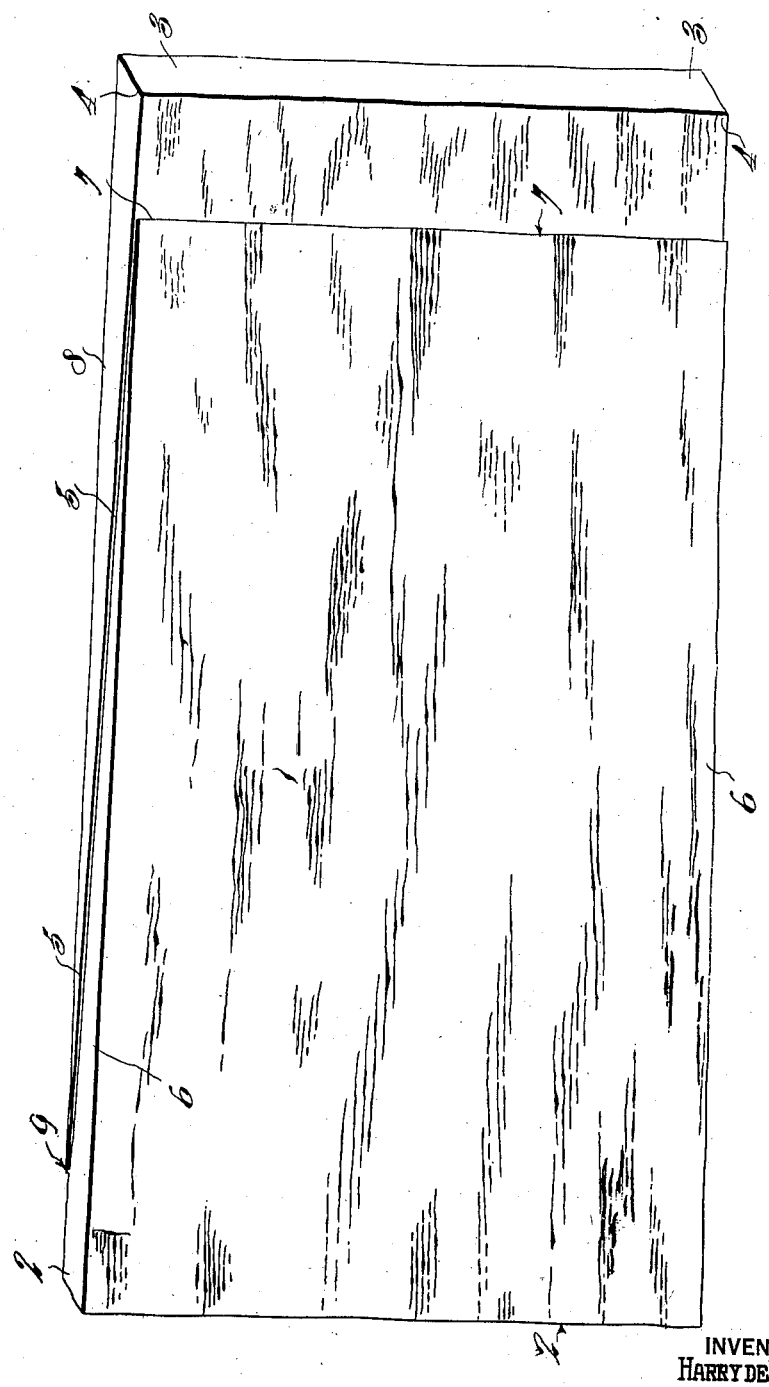
INVENTOR
HARRY DE W. KING.
BY
ATTORNEY Patented July 27, 1926.

1,593,800

UNITED STATES PATENT OFFICE.

HARRY DE W. KING, OF VANCOUVER, BRITISH COLUMBIA, CANADA.

METHOD OF MAKING SHINGLES.

Application filed December 10, 1925. Serial No. 74,652.

This invention relates to a method of finishing hand split shingles, such as are used for roofing and siding and to the shingle so produced.

To enable these hand split shingles to lie evenly on one another in the overlap, it is the customary practice to remove with a draw knife the irregularities of the natural split surfaces and impart a taper to the shingle.

This operation being manual is relatively expensive, is seriously wasteful of the wood and in other ways is not satisfactory.

In the method, which is the subject of this application, the desired flat surface and the taper is imparted to the shingle by passing the split shingle or shake endwise to a saw that will diagonally divide the thickness of the shake from the corner across the ends of one surface to the corresponding corner across the end of the opposite other surface, thus dividing the shake into two tapered shingles, each having a sawn flat surface and an upper surface split in the natural grain of the wood.

The particular means by which this idea is carried into effect and the details of the operation by which a close economy of wood is effected are fully set forth in the following specification, reference being made to the drawing by which it is accompanied, which is a perspective view of a shake as split along the natural grain of the wood and showing the plane of the saw-cut by which this shake is divided to form two shingles.

In this drawing 2 and 3 represent the opposite ends of a split shake, the thickness of which is substantially that of the butt of the desired shingle, 4 being the mark where the wood is bruised by the splitting tool or "frow", which injured portion must be removed from the finished shingles.

This shake 2, 3 is endwise passed between rollers, which are rubber covered to avoid injury to the natural split surface, to a saw by which a cut 5 is made obliquely from the corner adjacent one end 2 to the corner of the other face adjacent the other end 3. This cut 5 divides the shake into two tapered shingles 6 and 8, one having the butt 2 and a tip 7, and the other the butt 3 and tip 9, and each having a flat sawn face 5, and on the opposite side the natural surface of the split wood.

It is necessary that the finished shingles be of substantially uniform length from butt to tip, but to obtain the desired economy in this method of cutting, the blocks from which the blanks or shakes are to be split should be cut longer than the length of shingles required, and on this fact an important feature of economy in the finishing of these hand split shingles is based.

Instead of entering the saw-cut 5 in the butt end 2 or 3 of the shake, it is entered on the outer side of its thickness at one end, or slightly down the side therefrom, and terminates at a similar position at the other end 3 on the opposite face, so that the butt of the finished shingle is the same thickness as the butt of the split shake, and the length of the shingle is shortened by the saw kerf, not the thickness of the butt.

Over and above the economy of being able to obtain two shingles from one blank or shake, from which only one shingle is obtained at present, there is a distinctly appreciable saving due to splitting the blanks to substantially the thickness of the butt required in the shingle and by using a blank or shake, the length of which exceeds that of the finished shingle, whereby, by starting the oblique dividing cut a short distance from the end of the blank, the saw kerf is saved in the thickness of the shingle and is expended in shortening its length.

These features—the extra length of the blank or shake over that of the finished shingle and the entering of the oblique saw cut 5 at or beyond but not within the thickness of the blank or shake—are important features of the invention, and effect a saving of twenty per cent in a shingle having a five-eighths of an inch butt, and enable the thickness of the saw kerf to be saved in every case.

After the blank has been divided by the oblique cut 5 into two tapered shingles, the ends are trimmed to the required length at 7 and 9, taking care to remove the mark 4 of the splitting tool.

Having now particularly described my invention, I hereby declare that what I claim as new and desire to be protected in by Letters Patent, is:

1. The method of making shingles, which comprises, cutting the shingle blocks to a length exceeding the length of the shingle required, splitting blanks from these blocks in the natural cleavage of the wood to a desired thickness, and dividing the blank diagonally along its thickness to form two tapered shingles each having a butt, the thickness of which is not less than the original thickness of the blank.

2. The method of making shingles, which comprises, cutting the shingle block slightly longer than the length of shingle required, splitting blanks therefrom in the natural cleavage of the wood to a thickness approximately that required in the butt of the shingles and dividing the thickness of the blank with a saw cut extending obliquely from one face of the blank adjacent one end to the opposite face of the blank adjacent the other end, whereby the blank is divided into two similar tapered shingles, the butts of which are equal in thickness to that of the blank from which they are cut.

3. The method of making shingles, which comprises, cutting the shingle blocks slightly longer than the length of shingle required, splitting blanks therefrom in the natural cleavage of the wood to a thickness approximately that required in the butt of the shingle, dividing the thickness of the blank with a saw-cut from the corner of one face of the blank to the corresponding corner of the opposite face, whereby the blank is divided into two tapered shingles and trimming the butts and tips of the shingles to the desired length.

4. The method of making shingles, which comprises, cutting a shingle block to a length greater than that of the shingle required, splitting blanks therefrom in the natural cleavage of the wood to a desired thickness, dividing the thickness of the blank with a saw-cut extending obliquely from one face of the blank adjacent one end to the opposite face of the blank adjacent the other end whereby the blank is divided into two similar tapered shingles, and trimming the ends of these shingles to the desired length.

In testimony whereof I affix my signature.

HARRY DE W. KING.